W. J. TREVESSICK.
ANTIFRICTION THRUST BEARING FOR WHEELS.
APPLICATION FILED NOV. 6, 1907.
904,575.
Patented Nov. 24, 1908.
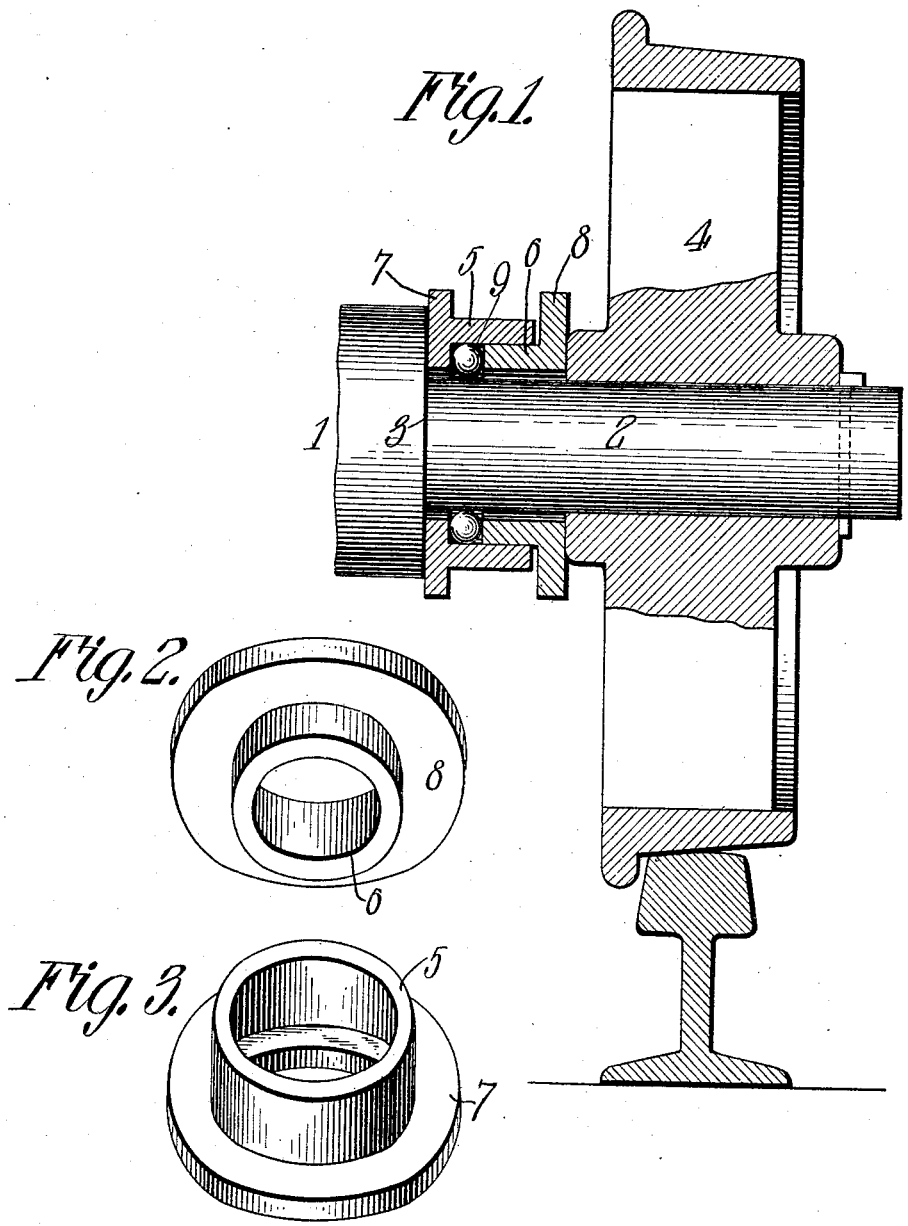
Witnesses
E. H. Stewart
E. Daniels
Inventor
William J. Trevessick.
By C. A. Snow & Co
Attorneys

UNITED STATES PATENT OFFICE.

WILLIAM J. TREVESSICK, OF GLEN CAMPBELL, PENNSYLVANIA.

ANTIFRICTION THRUST-BEARING FOR WHEELS.

No. 904,575.      Specification of Letters Patent.      Patented Nov. 24, 1908.

Application filed November 6, 1907. Serial No. 401,028.

*To all whom it may concern:*

Be it known that I, WILLIAM J. TREVESSICK, a citizen of the United States, residing at Glen Campbell, in the county of Indiana and State of Pennsylvania, have invented a new and useful Antifriction Thrust-Bearing for Wheels, of which the following is a specification.

This invention has relation to anti-friction thrust bearings for wheels and it consists in the novel construction and arrangement of its parts as hereinafter shown and described.

The object of the invention is to provide a bearing of the character indicated especially adapted to be interposed between the hub of a car wheel and a shoulder provided upon the axle upon which it is journaled. Said bearing is adapted to reduce the friction between the wheel and the axle as the wheel is subjected to lateral strain or thrust as when passing around curves etc. The bearing is of simple and durable construction and is so mounted upon the spindle of the axle as to offer little or no friction by reason of its presence upon the spindle in that its friction reducing elements bear directly against the said spindle.

In the accompanying drawing: Figure 1 is a transverse sectional view of a car wheel, and the anti-friction means mounted upon the spindle of an axle, and Figs. 2 and 3 are detailed perspective views of ball retaining parts of the anti-friction means.

The axle 1 is provided with a spindle 2 and a shoulder 3 located at the end of said spindle. The wheel 4 is journaled for rotation upon the said spindle. The anti-friction bearing is interposed between the hub of the wheel 4 and the shoulder 3 of the axle 1. The said bearing consists of the outer sleeve 5 and the inner sleeve 6, said inner sleeve being telescopically arranged within the outer sleeve. The sleeve 5 is provided at one end with an annular flange 7 which occupies a plane at a right angle to the said sleeve, said sleeve being joined with the said flange at a line intermediate of the inner and outer peripheries of the said flange. Said flange is adapted to bear at one face against the shoulder 3. The sleeve 6 is provided at one end with an annular flange 8 which is located entirely beyond the periphery of the sleeve 6 and which occupies a plane lying at a right angle to the said sleeve 6. The sleeve 5 is of greater length than the sleeve 6 and the bearing balls 9 are interposed between the end of the sleeve 6 remote from that end thereof carrying the flange and the face of the flange 7 opposite the face thereof which bears against the shoulder 3. The said balls also bear against the periphery of the spindle 2 and the inner wall of the sleeve 5 and properly center the said sleeves and their attached flanges with relation to the spindle 2.

The sleeve 5 is of smooth interior bore while the outer surface of the sleeve 6 is smooth. Consequently, the said sleeves may have direct longitudinal movement with relation to each other. The sleeve 6 fits snugly within the sleeve 5 and the balls 9 are of such diameter as to space the end of the sleeve 5 remote from the flange 7 slightly away from the flange 8 carried by the sleeve 6.

By this arrangement of the anti-friction thrust bearing and the relative arrangement of the parts thereof it is obvious that when the wheel 4 is subjected to lateral strain or thrust, as when going around a curve the friction incident to said thrust will be taken up or reduced in a great measure by the bearing interposed between the hub of the wheel and the axle shoulder 3 for the flange 7 and the sleeve 5 will tend to remain stationary with the axle while the flange 8 and the sleeve 6 will tend to rotate with the hub of the wheel 4. The interposed balls 9 will reduce the friction between the sleeves 5 and 6 and also will reduce the friction between the spindle 2 and the said bearing should the said bearing rotate upon the said spindle.

The bearing as described is especially adapted to be used in combination with the axles and wheels of mining cars and as above pointed out are intended to reduce the friction incident to lateral strain or thrust as the cars are drawn around curves. It will also be seen that the parts are of simple and durable construction and that the bearing as an entirety may be easily and readily applied to an axle or detached therefrom.

By the use of the bearing above described a car may be moved with ease by draft animals or by a miner when he desires the car moved near a certain point.

Having described my invention what I claim as new and desire to secure by Letters-Patent is:—

In combination with an axle having a spindle portion and a shoulder, a wheel journaled upon the spindle, a bearing interposed between the wheel and shoulder, and consisting of inner and outer sleeves slidably telescoping each other, and each being freely mounted upon the spindle and independent of each other, said sleeves having parallel bearing surfaces, and bearing balls interposed between the parallel bearing surfaces of the sleeves and having contact with the spindle.

In testimony that I claim the foregoing as my own, I have hereto affixed my signature in the presence of two witnesses.

WILLIAM J. TREVESSICK.

Witnesses:
J. E. MAQUILKEN,
JOHN W. MAQUILKEN.